United States Patent
Trichy et al.

(10) Patent No.: US 10,291,124 B2
(45) Date of Patent: May 14, 2019

(54) SPREAD SPECTRUM CONTROL APPARATUS AND METHOD

(71) Applicant: Active-Semi (BVI) Inc., Allen, TX (US)

(72) Inventors: Narasimhan Trichy, Plano, TX (US); Masashi Nogawa, Sachse, TX (US)

(73) Assignee: Active-Semi (BVI) Inc., Allen, TX (US)

( * ) Notice: Subject to any disclaimer, the term of this patent is extended or adjusted under 35 U.S.C. 154(b) by 0 days.

(21) Appl. No.: 16/025,016

(22) Filed: Jul. 2, 2018

(65) Prior Publication Data
US 2019/0013733 A1  Jan. 10, 2019

Related U.S. Application Data

(60) Provisional application No. 62/529,246, filed on Jul. 6, 2017.

(51) Int. Cl.
| | |
|---|---|
| *H02M 3/158* | (2006.01) |
| *H02M 1/44* | (2007.01) |
| *H02M 1/088* | (2006.01) |
| *H02M 1/00* | (2006.01) |

(52) U.S. Cl.
CPC ........... *H02M 3/158* (2013.01); *H02M 1/088* (2013.01); *H02M 1/44* (2013.01); *H02M 2001/0025* (2013.01)

(58) Field of Classification Search
CPC ........... H02N 1/44; H02N 3/155–1588; H02N 2001/0025
See application file for complete search history.

(56) References Cited

U.S. PATENT DOCUMENTS

| | | | | |
|---|---|---|---|---|
| 3,495,093 A | * | 2/1970 | McCutcheon | G01R 31/3193 307/52 |
| 6,351,162 B1 | * | 2/2002 | Schwartz | H01H 47/325 327/110 |
| 7,504,810 B1 | * | 3/2009 | Tagare | H02M 1/44 323/282 |
| 8,823,344 B2 | * | 9/2014 | Kushida | H02M 3/1588 323/271 |
| 9,887,710 B1 | * | 2/2018 | Lim | H03M 9/00 |
| 10,056,822 B1 | * | 8/2018 | Zhang | H02M 3/156 |
| 2007/0120540 A1 | * | 5/2007 | Sase | H02M 3/156 323/222 |
| 2007/0182395 A1 | * | 8/2007 | Sakai | H02M 3/1588 323/283 |
| 2007/0236971 A1 | * | 10/2007 | Chen | H02M 3/1588 363/56.01 |

(Continued)

*Primary Examiner* — Yusef A Ahmed
(74) *Attorney, Agent, or Firm* — Slater Matsil, LLP

(57) ABSTRACT

A power converter includes a first switch and a second switch connected in series between an input power source and ground, an inductor connected between a common node of the first switch and the second switch, and an output capacitor and a pulse width modulation (PWM) generator configured to generate a gate drive signal for the first switch, wherein a leading edge of the gate drive signal is determined by a comparison result between a reference and a voltage proportional to an output voltage of the power converter and a trailing edge of the gate drive signal is determined by a comparison result between a voltage ramp and a variable voltage source.

19 Claims, 11 Drawing Sheets

(56) References Cited

U.S. PATENT DOCUMENTS

| | | | | |
|---|---|---|---|---|
| 2008/0284398 A1* | 11/2008 | Qiu | ............... | H02M 3/156 |
| | | | | 323/283 |
| 2009/0237055 A1* | 9/2009 | Sakai | ............... | H02M 3/1588 |
| | | | | 323/284 |
| 2010/0253313 A1* | 10/2010 | Herzer | ............... | H02M 3/156 |
| | | | | 323/312 |
| 2010/0301827 A1* | 12/2010 | Chen | ............... | H02M 3/156 |
| | | | | 323/299 |
| 2011/0273156 A1* | 11/2011 | Miyamae | ............... | H02M 3/156 |
| | | | | 323/288 |
| 2013/0051089 A1* | 2/2013 | Pan | ............... | H02M 1/44 |
| | | | | 363/21.17 |
| 2014/0084886 A1* | 3/2014 | Causse | ............... | H02M 3/158 |
| | | | | 323/282 |
| 2014/0253072 A1* | 9/2014 | Hussien | ............... | H02M 1/36 |
| | | | | 323/281 |
| 2016/0036322 A1* | 2/2016 | Miyamae | ............... | H02M 3/156 |
| | | | | 323/284 |
| 2016/0276931 A1* | 9/2016 | Trichy | ............... | H02M 3/158 |
| 2017/0149240 A1* | 5/2017 | Wu | ............... | H02J 1/00 |
| 2018/0004240 A1* | 1/2018 | Gritti | ............... | B81B 3/0045 |
| 2018/0178710 A1* | 6/2018 | Ichikawa | ............... | B60Q 1/04 |
| 2018/0269787 A1* | 9/2018 | Chen | ............... | H02M 3/156 |
| 2019/0028030 A1* | 1/2019 | Aoki | ............... | H02M 3/1588 |

* cited by examiner

SPREAD SPECTRUM CONTROL APPARATUS AND METHOD

CROSS REFERENCE TO RELATED APPLICATIONS

This application is related to, and claims priority to, U.S. Provisional Application No. 62/529,246, titled, "Spread Spectrum Control Apparatus and Method" filed on Jul. 6, 2017, which is herein incorporated by reference.

TECHNICAL FIELD

The present disclosure relates to a control scheme for a power converter, and, in particular embodiments, to a constant on-time power converter employing a spread spectrum control scheme.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme can enable power converters to provide fast transient responses. A buck converter employing the constant on-time control scheme does not require an error amplifier. In fact, a simple constant on-time circuit may only comprise a feedback comparator and an on-timer. In operation, the feedback circuit of the power converter (e.g., buck converter) directly compares a feedback signal including both dc and ripple voltages with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

A power converter employing the constant on-time control scheme is simple to design. However, the switching of the power converter may cause some electromagnetic interference (EMI) issues. The interference from the switching of the power converters may cause unexpected behaviors at components placed in or adjacent to the power converter, thereby degrading the performance of these components.

It would be desirable to provide an apparatus and/or a method for spreading the switching frequency of a power converter over a wide bandwidth so that the spectral energy of the power converter can be evenly distributed over the bandwidth, thereby improving the EMI performance of the power converter.

SUMMARY

In particular embodiments, a spread spectrum control scheme may improve the spectral energy distribution of a constant on-time power converter.

In accordance with an embodiment, an apparatus comprises a first switch and a second switch connected in series between an input power source and ground, an inductor connected between a common node of the first switch and the second switch, and an output capacitor and a pulse width modulation (PWM) generator configured to control an on-time of the first switch, wherein the PWM generator has a first input configured to receive a comparison result between a first reference and a voltage ramp, and a second input configured to receive a feedback signal, and wherein the feedback signal is generated based on a comparison result between a voltage across the output capacitor and a second reference and the first reference comprises a variable voltage source configured to adjust a threshold for turning off the first switch.

In accordance with another embodiment, a method comprises providing a ramp signal proportional to an input voltage of a constant on-time power converter, varying a reference signal so as to approximate a sinusoidal waveform in a piecewise manner and terminating a turn-on time of a high-side switch of the constant on-time power converter based upon a comparison between the ramp signal and the reference signal.

In accordance with yet another embodiment, a power converter comprises a first switch and a second switch connected in series between an input power source and ground, an inductor connected between a common node of the first switch and the second switch, and an output capacitor and a pulse width modulation (PWM) generator configured to generate a gate drive signal for the first switch, wherein a leading edge of the gate drive signal is determined by a comparison result between a reference and a voltage proportional to an output voltage of the power converter and a trailing edge of the gate drive signal is determined by a comparison result between a voltage ramp and a variable voltage source.

An advantage of a preferred embodiment of the present disclosure is improving a constant on-time power converter's performance through a spread spectrum control mechanism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a spread spectrum control apparatus and method for a hysteretic-based power converter. The invention may also be applied, however, to a variety of power converters. Hereinafter, various embodiments will be explained in detail with reference to the accompanying drawings.

Figure 1:
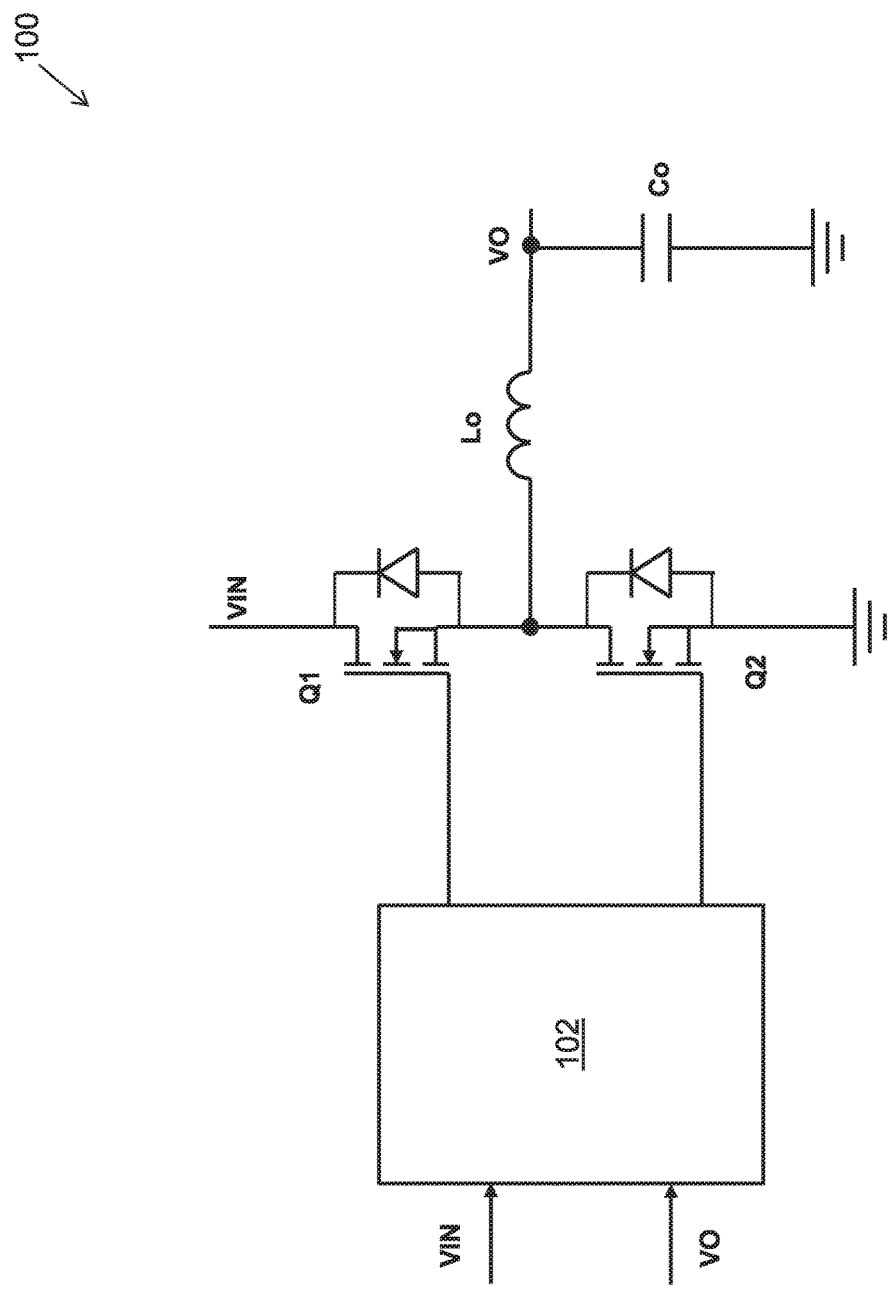
FIG. 1 illustrates a block diagram of a power converter employing a spread spectrum control scheme in accordance with various embodiments of the present disclosure.

FIG. 1 illustrates a block diagram of a power converter employing a spread spectrum control scheme in accordance with various embodiments of the present disclosure. The power converter 100 is a step-down power converter (also known as a buck converter). The power converter 100 includes a first switch Q1, a second switch Q2, an inductor Lo and an output capacitor Co. As shown in FIG. 1, the first switch Q1 and the second switch Q2 are connected in series between an input power source VIN and ground. The inductor Lo is connected between the common node of the first switch Q1 and the second switch Q2, and the output capacitor Co.

In some embodiments, the power converter 100 is a constant on-time power converter. The first switch Q1 and the second switch Q2 are implemented as n-type transistors. The gate of the first switch Q1 and the gate of the second switch Q2 are controlled by a spread spectrum control apparatus 102.

It should be noted that the power converter 100 shown in FIG. 1 is merely an example, which should not unduly limit the scope of the claims. One of ordinary skill in the art would recognize many variations, alternatives, and modifications. For example, the first switch Q1 may be implemented as a p-type transistor.

In some embodiments, the spread spectrum control apparatus 102 may apply both the constant on-time control and the spread spectrum control to the power converter 100. More particularly, the spread spectrum control apparatus 102 may comprise a first control circuit for controlling the power converter 100 so that the power converter operates in a constant on-time mode. Furthermore, the spread spectrum control apparatus 102 may comprise a second control circuit for varying the switching frequency of the power converter 100 so that the spectral energy of the power converter 100 can be evenly distributed over a wide range.

As shown in FIG. 1, the spread spectrum control apparatus 102 is configured to receive the input voltage VIN and the output voltage Vo. Based upon the output voltage Vo and/or the input voltage VIN, the spread spectrum control apparatus 102 generates two gate signals for controlling the operation of the power converter 100. The detailed operation of the spread spectrum control apparatus 102 will be described below with FIGS. 2-10.

Figure 2:
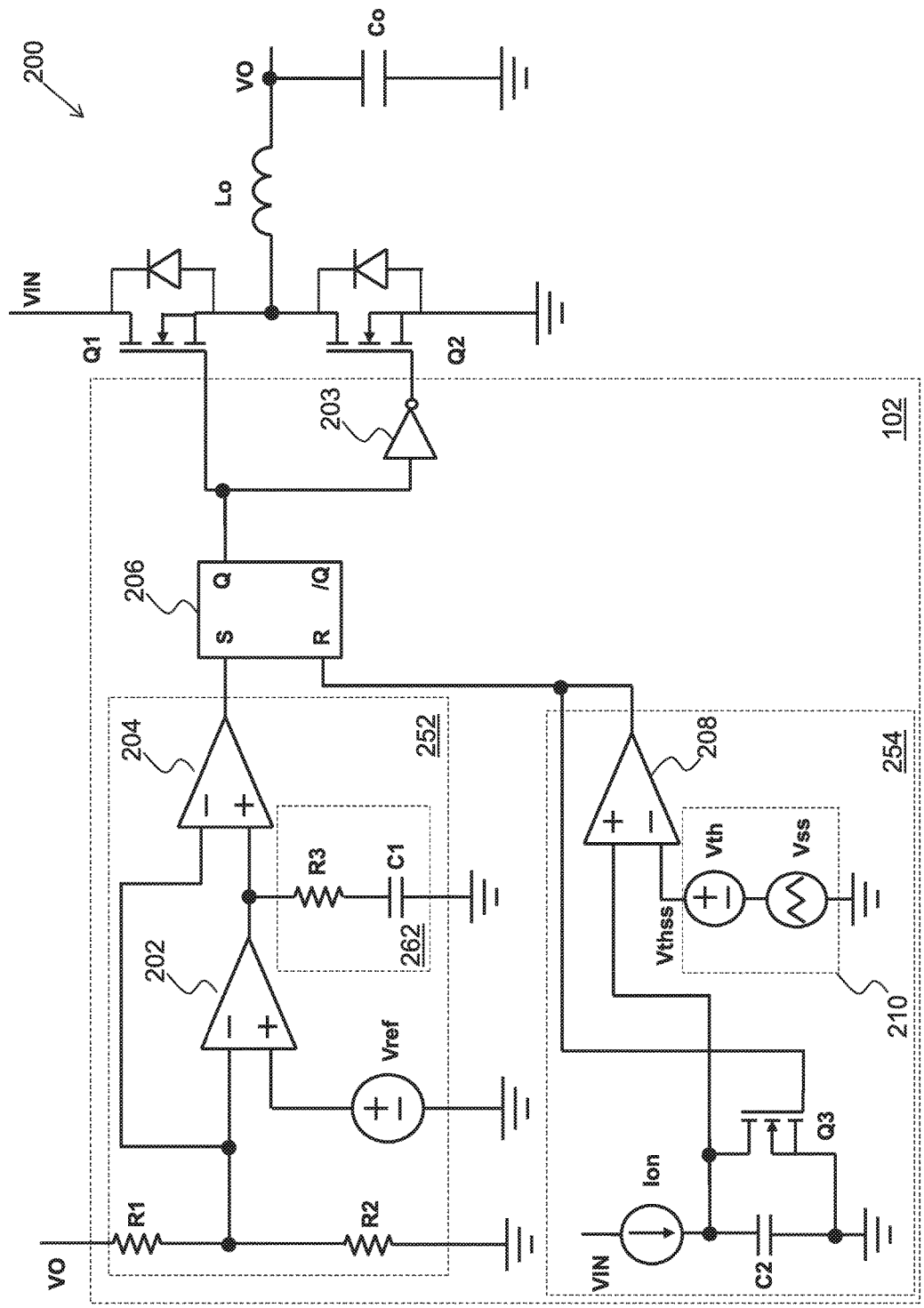
FIG. 2 illustrates a first implementation of the power converter shown in FIG. 1 in accordance with various embodiments of the present disclosure.

FIG. 2 illustrates a first implementation of the power converter shown in FIG. 1 in accordance with various embodiments of the present disclosure. More particularly, FIG. 2 illustrates a schematic diagram of the spread spectrum control apparatus 102 in accordance with various embodiments of the present disclosure. As shown in FIG. 2, the spread spectrum control apparatus 102 comprises three portions, namely a constant on-time feedback control circuit 252, a pulse width modulation (PWM) generation circuit 206 and a constant on-time timer circuit 254.

The constant on-time feedback control circuit 252 includes a voltage divider formed by resistors R1 and R2, an error amplifier 202, a compensation network 262, a reference Vref and a comparator 204. As shown in FIG. 2, the inverting input of the error amplifier 202 is connected to the common node of resistors R1 and R2. The non-inverting input of the error amplifier 202 is connected to the reference Vref. The reference Vref has a predetermined value (e.g., 0.8 V). Depending on different applications and design needs, the reference Vref may vary accordingly.

The compensation network 262 is connected to the output of the error amplifier 202. In some embodiments, the compensation network 262 is employed to stabilize the feedback loop of the power converter 100. As shown in FIG. 2, the compensation network 262 includes resistor R3 and capacitor C1 connected in series between the output of the error amplifier 202 and ground. The series-connected R3 and C1 form a pole for stabilizing the power converter 100. The placement of the compensation pole may vary depending on different applications and design needs. For example, the compensation pole may be placed between the crossover frequency and the switching frequency of the power converter 100. In alternative embodiments, the compensation pole is designed to be lower than the crossover frequency (e.g., about one tenth of the crossover frequency).

The output of the error amplifier 202 is connected to a non-inverting input of the comparator 204. The inverting input of the comparator 204 is connected to the common node of resistors R1 and R2. The output of the comparator 204 is connected to one input of the PWM generation circuit 206.

In some embodiments, the PWM generation circuit 206 is implemented as an R-S latch as shown in FIG. 2. Throughout the description, the PWM generation circuit 206 may be alternatively referred to as the R-S latch 206. The set input of the R-S latch 206 is connected to the output of the comparator 204. The reset input of the R-S latch 206 is connected to an output of the constant on-time timer circuit 254. The output of the R-S latch 206 is connected to the gate of Q1 directly and connected to the gate of Q2 through an inverter 203.

According to the operating principle of the R-S latch, the output of the constant on-time feedback control circuit 252 determines the turn-on edge or the leading edge of the gate drive signal applied to Q1. The output of the constant on-time timer circuit 254 determines the turn-off edge or the trailing edge of the gate drive signal applied to Q1.

The constant on-time timer circuit 254 includes a current source Ion, a capacitor C2, a switch Q3, a comparator 208 and a spread spectrum reference 210. As shown in FIG. 2, the current source is coupled to the input voltage VIN. In some embodiments, the current level of the current source Ion is proportional to the input voltage VIN. The voltage across the capacitor C2 is fed into a non-inverting input of the comparator 208. The inverting input of the comparator 208 is connected to the spread spectrum reference 210.

In operation, when Q1 is turned on, a logic level "1" and a logic level "0" are applied to the set input and the reset input of the R-S latch 206 respectively. The logic level "0" turns off the switch Q3. As a result of turning off the switch Q3, the current source Ion starts to charge the capacitor C2 in a linear manner. The voltage across the capacitor C2 is compared with the voltage of the spread spectrum reference 210 at the comparator 208. After the voltage across the capacitor C2 reaches the voltage of the spread spectrum reference 210, the output of the comparator 208 generates a logic level "1" which turns off Q1 through the R-S latch 206. At the same time, the logic level "1" from the comparator 208 turns on the switch Q3. The turned-on switch Q3 discharges the capacitor C2 and maintains the voltage across the capacitor C2 equal to about zero. As such, the voltage across the capacitor C2 is a voltage ramp. The voltage ramp is in sync with the gate drive signal applied to Q1. In other words, the voltage ramp starts from zero and linearly rises during the turn-on time of Q1. The voltage ramp goes back to zero at the trailing edge of the gate drive signal applied to Q1.

As shown in FIG. 2, the comparison between the voltage Vthss of the spread spectrum reference 210 and the voltage across the capacitor C2 determines the on-time of Q1. By varying the voltage level of the spread spectrum reference 210, the on-time of Q1 may vary accordingly.

The variation of the on-time of Q1 may have an impact on the switching frequency of the power converter 200. In some embodiments, a reduced on-time of Q1 is equivalent to increasing the switching frequency of the power converter 200. On the other hand, an increased on-time of Q1 is equivalent to reducing the switching frequency of the power converter 200. As such, the switching frequency of the power converter 200 may vary by adjusting the voltage level of the spread spectrum reference 210.

In some embodiments, the voltage level of the spread spectrum reference 210 is modulated so that the switching frequency of the power converter 200 is spread over a bandwidth. As a result of spreading the switching frequency, the spectral energy of the power converter 200 can be evenly distributed over the bandwidth, thereby improving the electromagnetic interference (EMI) performance of the power converter 200.

As shown in FIG. 2, the spread spectrum reference 210 includes a dc voltage source Vth and a variable voltage source Vss. The voltage Vthss of the spread spectrum reference 210 is the sum of the dc voltage source Vth and the variable voltage source Vss. In some embodiments, the voltage level of the voltage source Vth is proportional to the output voltage Vo. The voltage level of the variable voltage source Vss may vary for achieving the spread spectrum control described above. In some embodiments, Vss may be adjusted based upon any arbitrary or complex waveforms. For example, the output of Vss may produce a wave whose waveform resembles a sinusoidal curve. Alternatively, the output of Vss may be a saw-tooth waveform.

The dc voltage source Vth and the variable voltage source Vss may be added together through a suitable device (e.g., an adder) and the sum of the dc voltage source Vth and the variable voltage source Vss is fed into the inverting input of the comparator 208 as shown in FIG. 2. The detailed structures of the spread spectrum reference 210 will be described below with respect to FIGS. 3-5.

Figure 3:
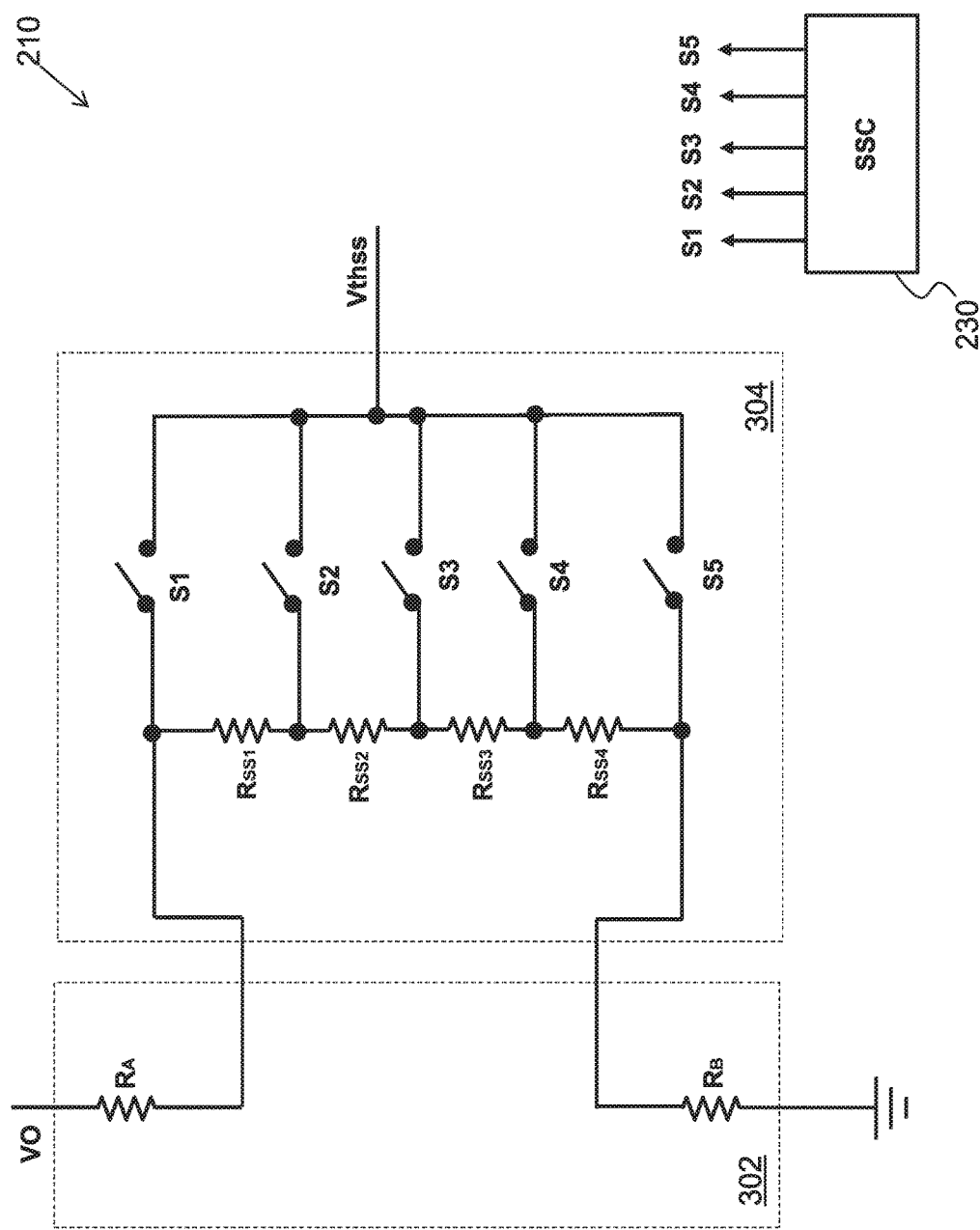
FIG. 3 illustrates a schematic diagram of the spread spectrum reference shown in FIG. 2 in accordance with various embodiments of the present disclosure.

FIG. 3 illustrates a schematic diagram of the spread spectrum reference shown in FIG. 2 in accordance with various embodiments of the present disclosure. The spread spectrum reference 210 includes a first portion 302 and a second portion 304. The first portion 302 includes resistors RA and RB. The second portion 304 includes resistors Rss1, Rss2, Rss3 and Rss4, and switches S1, S2, S3, S4 and S5. The resistors Rss1, Rss2, Rss3 and Rss4, and switches S1, S2, S3, S4 and S5 form a resistor-switch network. As shown in FIG. 3, the resistors Rss1, Rss2, Rss3 and Rss4 are connected in series between the resistors RA and RB. The switches S1, S2, S3, S4 and S5 have their first terminals connected to the resistors Rss1, Rss2, Rss3 and Rss4, and their second terminals connected together. As shown in FIG. 3, two first terminals of two adjacent switches (e.g., S1 and S2) are connected to two terminals of a corresponding resistor (e.g., Rss1). The common node of the switches S1, S2, S3, S4 and S5 is the output of the spread spectrum reference 210.

The first portion 302 functions as the dc voltage source Vth shown in FIG. 2. In particular, when the resistors Rss1, Rss2, Rss3 and Rss4 are shorted by the turned-on switches (e.g., the turned on S1 and S5), resistors RA and RB form a voltage divider connected between the output voltage VO and ground. Vthss is connected to the divider through the turned on S1 and S5. On the other hand, when a resistor (e.g., Rss1) is connected in series with resistors RA and RB, the voltage at Vthss may change accordingly. For example, when switch S1 is turned off and switches S2 and S5 are turned on, Rss1, RA and RB are connected between the output voltage VO and ground. The voltage level at Vthss is reduced slightly after Rss1 has been added into the voltage divider.

In sum, the resistor-switch network in FIG. 3 forms multiple tap points between resistors RA and RB for achieving a variable voltage source. The voltage level at Vthss may vary by selecting one tap point of the multiple tap points through controlling the on/off of switches S1-S5. Since many tap points can be obtained through various combinations of turning on and off switches S1-S5, the voltage variations at Vthss may be in a wide range. In some embodiments, Vthss can be adjusted by turning on one single switch (e.g., S1). The variation step of Vthss can be linear or non-linear depending on the values of resistors Rss1-Rss4. In some embodiments, the variation of Vthss may produce a wave whose waveform resembles a sinusoidal curve. The schematic structure and operation principle of varying Vthss following a sinusoidal function will be described in detail with respect to FIG. 5.

A controller 230 is employed to generate the gate drive signals for switches S1-S5. The controller 230 may be implemented as a digital controller. Alternatively, the controller 230 may be formed by suitable discrete components. Furthermore, the controller 230 may be a simple logic circuit including suitable counters, decoders, line selectors, any combinations thereof and/or the like. Throughout the description, the controller 230 may be alternatively referred to as a spread spectrum controller (SSC) 230.

It should be recognized that while FIG. 3 illustrates the second portion 304 of the spread spectrum reference 210 with four resistors and five switches, the second portion 304 of the spread spectrum reference 210 could accommodate any number of resistors and switches. For example, the second portion 304 of the spread spectrum reference 210 may comprise nine resistors and ten switches (not shown but illustrated in FIG. 5).

One advantageous feature of having the spread spectrum reference 210 shown in FIG. 3 is the switch-resistor network does not require a dedicated bias current source, thereby reducing the quiescent current consumption of the power converter 100.

Figure 4:
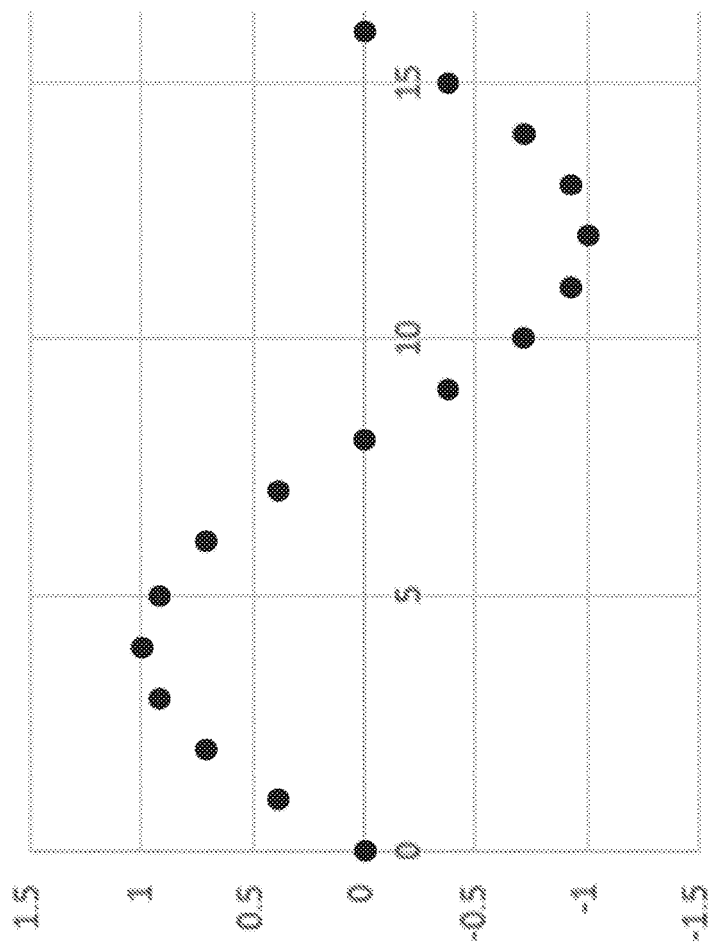
FIG. 4 illustrates a digitized sinusoidal waveform for controlling the spread spectrum reference shown in FIG. 3 in accordance with various embodiments of the present disclosure.

FIG. 4 illustrates a digitized sinusoidal waveform for controlling the spread spectrum reference shown in FIG. 3 in accordance with various embodiments of the present disclosure. In some embodiments, the voltage variation of Vthss in FIG. 3 may follow a sinusoidal waveform. The sinusoidal waveform can be achieved through a digitized sinusoidal waveform shown in FIG. 4. The digitized sinusoidal waveform shown in FIG. 4 includes sixteen steps. The hardware implementation for generating a variable voltage source based upon this sixteen-step sinusoidal waveform will be described below in detail with respect to FIG. 5.

It should be noted that digitized sinusoidal waveform shown in FIG. 4 is selected purely for demonstration purposes and are not intended to limit the various embodiments of the present disclosure to any particular sinusoidal waveforms.

Figure 5:
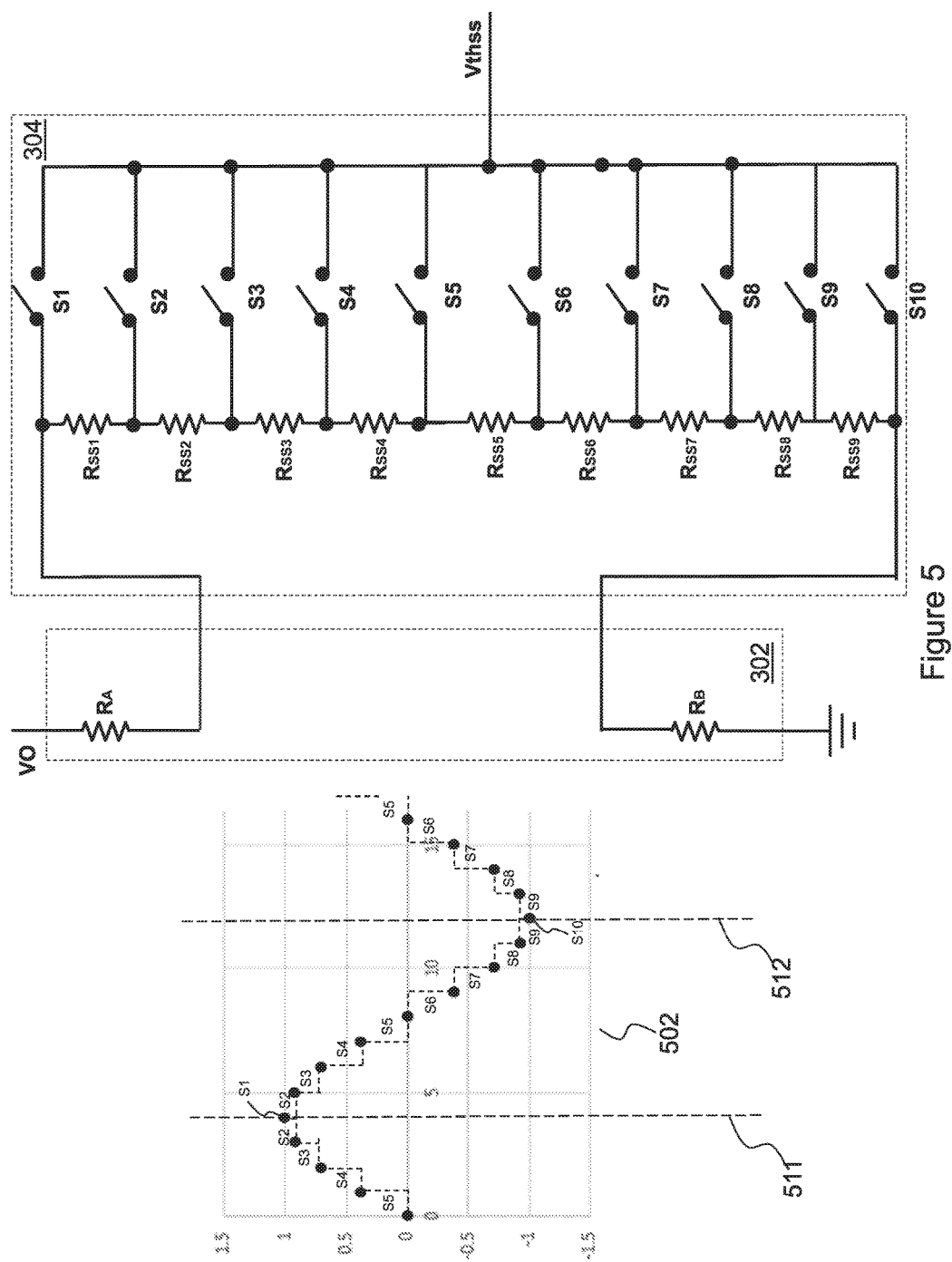
FIG. 5 illustrates a schematic diagram of a tap-selecting logic circuit for generating a variable voltage source based upon the sixteen-step sinusoidal waveform shown in FIG. 4 in accordance with various embodiments of the present disclosure.

FIG. 5 illustrates a schematic diagram of a tap-selecting logic circuit for generating a variable voltage source based upon the sixteen-step sinusoidal waveform shown in FIG. 4 in accordance with various embodiments of the present disclosure. The tap-selecting logic circuit includes resistors Rss1, Rss2, Rss3, Rss4, Rss5, Rss6, Rss7, Rss8 and Rss9, and switches S1, S2, S3, S4, S5, S6, S7, S8, S9 and S10. The resistors Rss1-Rss9 are connected in series between resistors RA and RB. In some embodiments, the resistors Rss1-Rss9 are weighted according to the sinusoidal waveform shown in FIG. 4. In other words, the resistors Rss1-Rss9 are selected to approximate a sinusoidal waveform in a piecewise manner using the voltage steps generated by the resistors Rss1-Rss9.

In some embodiments, the voltage perturbation at Vthss follows the sinusoidal waveform 502 shown in FIG. 5. In particular, the voltage perturbation includes sixteen steps resembling a sinusoidal waveform.

As shown in FIG. 5, the sinusoidal waveform 502 has been divided into sixteen steps. Since the first half of the sinusoidal waveform 502 is symmetrical about its center line 511 (90 degrees) and the second half of the sinusoidal waveform 502 is symmetrical about its center line 512 (270 degrees), steps symmetrical to each other can be implemented by turning on a same switch. For example, the first step and the last step of the first half of the sinusoidal waveform 502 can be implemented by turning on switch S5 as shown in FIG. 5. Likewise, the first step and the last step of the second half of the sinusoidal waveform 502 can be implemented by turning on switch S6 as shown in FIG. 5.

In sum, the sinusoidal waveform 502 can be achieved by turning on the switches S1-S10 in the order of S5, S4, S3, S2, S1, S2, S3, S4, S5, S6, S7, S8, S9, S10, S8, S8, S7, S6, S5 as shown in FIG. 5.

In some embodiments, the frequency of the sinusoidal waveform 502 can be set by controlling the turn-on time of the switches S1-S10. More particularly, a counter (not shown) may be employed to count the turn-on pulses of Q1 (shown in FIG. 2). The turn-on time of switches S1-S10 can be set by counting the turn-on pulses of Q1. For example, each switch (e.g., S1) is turned on for about four turn-on pulses of Q1. That is, the turn-on time of each switch is equal to about four switching cycles of Q1. The frequency of the sinusoidal waveform 502 can be adjusted by changing the turn-on time of the switches S1-S10. The frequency of the sinusoidal waveform 502 can be increased by reducing the turn-on time of each switch. For example, depending on design needs, the frequency of the sinusoidal waveform 502 can be doubled by reducing the turn-on time of each switch (e.g., S1) from about four turn-on pulses of Q1 to about two turn-on pulses of Q1.

One advantageous feature of having a counter to determine the turn-on time of the switches S1-S10 is that the tap-selecting logic circuit shown in FIG. 5 does not require an oscillator to determine the turn-on time of the switches S1-S10. Such a tap-selecting logic circuit without having an oscillator can reduce circuit complexity.

It should be noted that in some embodiments, the tap-selecting logic circuit shown in FIG. 5 is synchronized to the switching period of the power converter 200. More particularly, the timing control of the tap-selecting logic circuit is synchronized to the timing control of the PWM generation circuit of the power converter 200.

Figure 6:
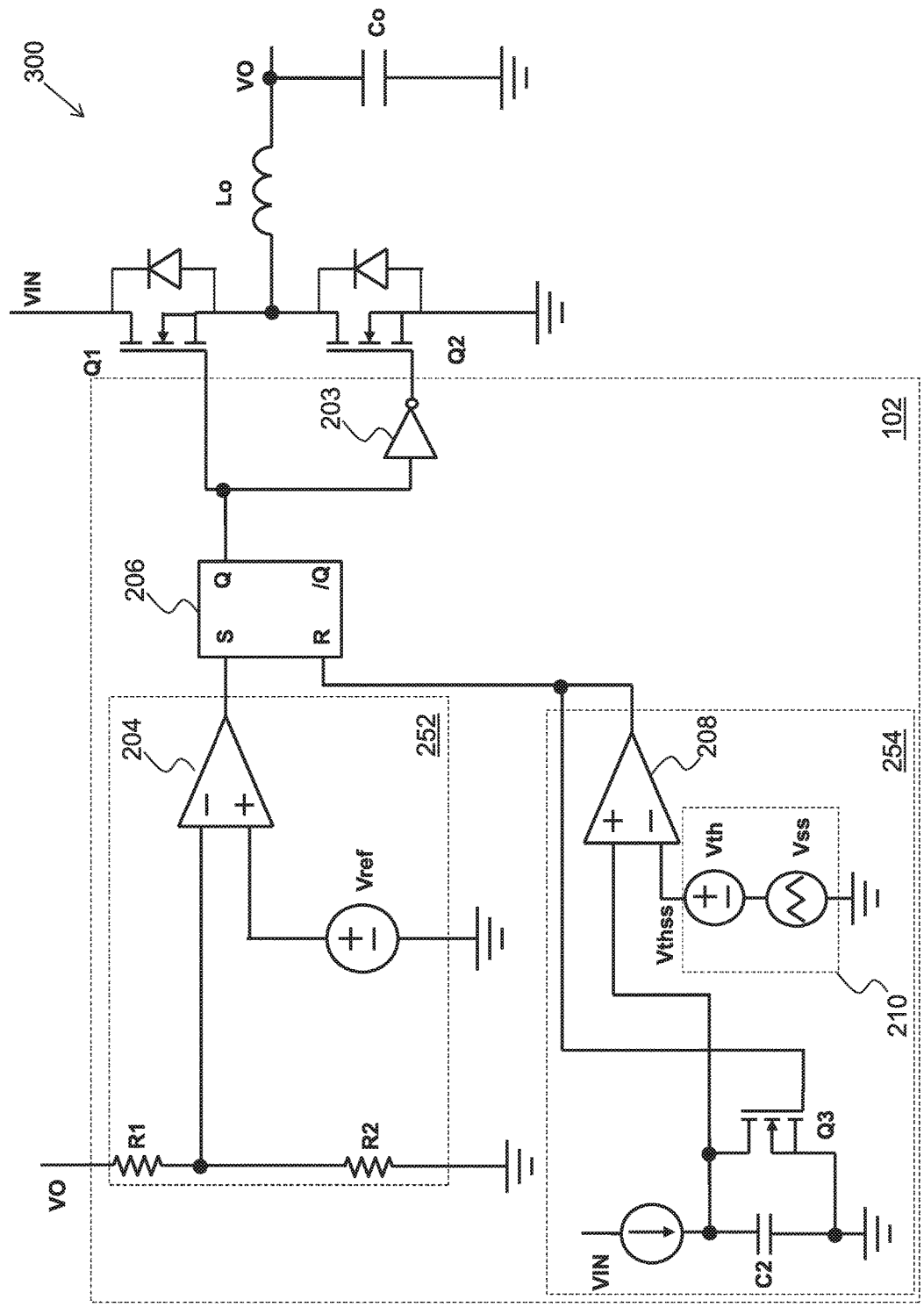
FIG. 6 illustrates a second implementation of the power converter shown in FIG. 1 in accordance with various embodiments of the present disclosure.

FIG. 6 illustrates a second implementation of the power converter shown in FIG. 1 in accordance with various embodiments of the present disclosure. The power converter 300 shown in FIG. 6 is similar to the power converter 200 shown in FIG. 2 except that the constant on-time feedback control circuit 252 does not include an error amplifier. As shown in FIG. 6, the common node of resistors R1 and R2 is directly connected to the inverting input of the comparator 204. In some embodiments, the power converter 300 may further include at least one low-pass RC filter (not shown) for stabilizing the power converter 300.

Figure 7:
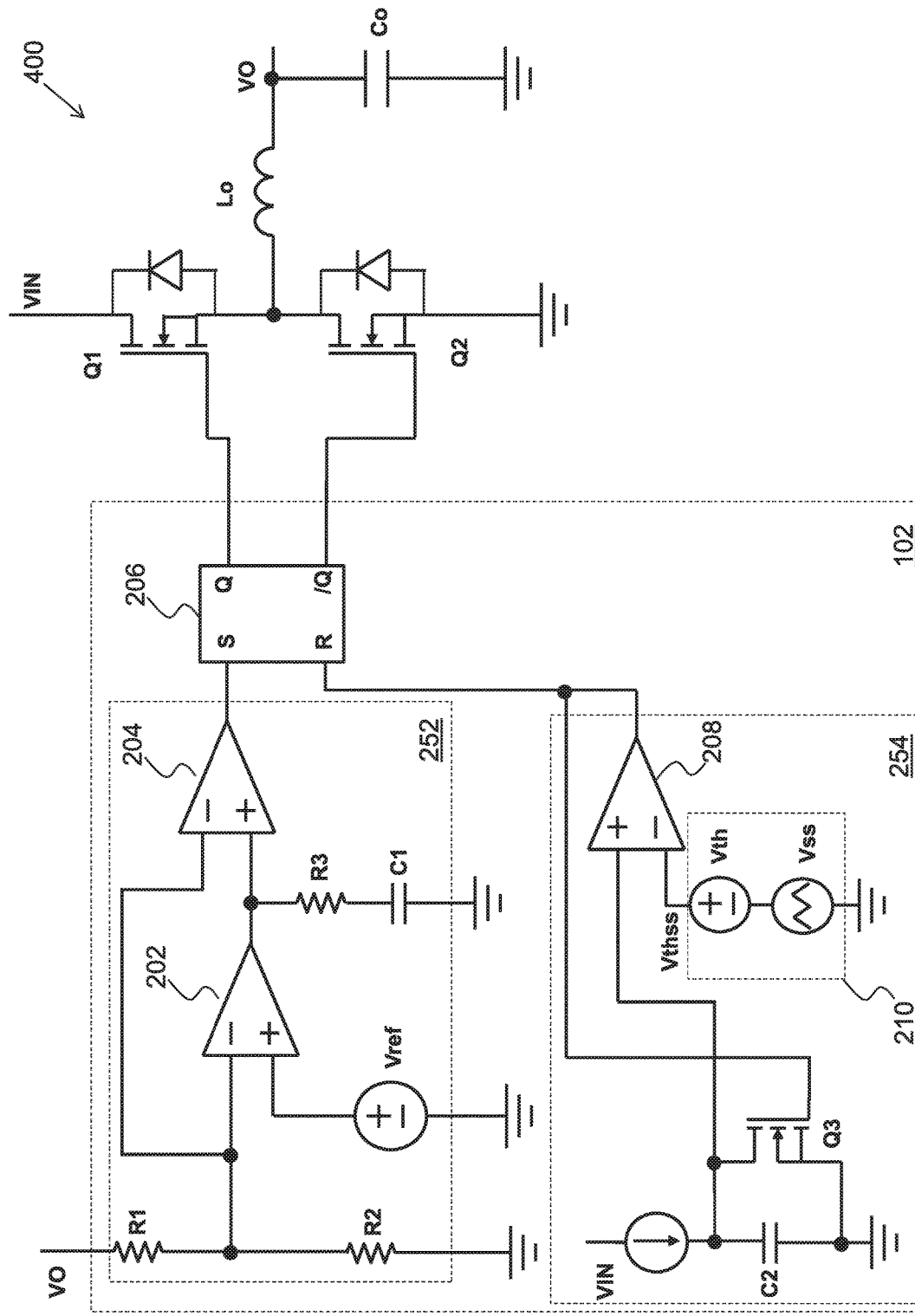
FIG. 7 illustrates a third implementation of the power converter shown in FIG. 1 in accordance with various embodiments of the present disclosure.

FIG. 7 illustrates a third implementation of the power converter shown in FIG. 1 in accordance with various embodiments of the present disclosure. The power converter 400 shown in FIG. 7 is similar to the power converter 200 shown in FIG. 2 except that the gate drive signal of Q2 is from the R-S latch 206 directly. As shown in FIG. 7, the gate of Q1 is connected to the Q output of the R-S latch 206. The gate of Q2 is connected to the Q-bar output of the R-S latch 206.

It should be noted that a driver may be placed between the output of the R-S latch 206 and the corresponding gate of the switch. The driver can provide high speed and high current drive capability for the power converter 200. Furthermore, the driver between the Q output of the R-S latch 206 and the gate of Q1 may comprise a level-shifting circuit for driving an n-channel high-side switch (e.g., Q1).

Figure 8:
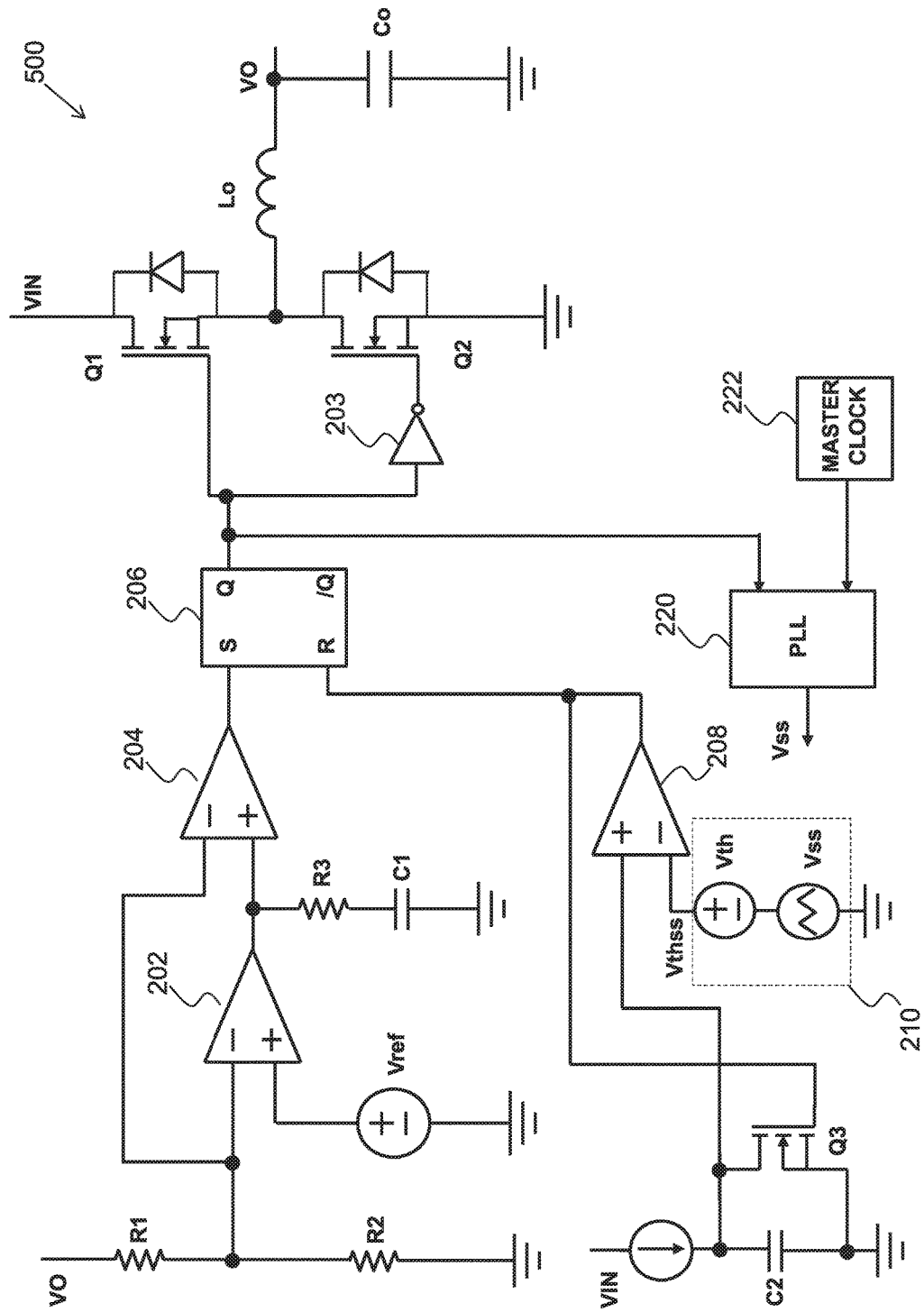
FIG. 8 illustrates a fourth implementation of the power converter shown in FIG. 1 in accordance with various embodiments of the present disclosure.

FIG. 8 illustrates a fourth implementation of the power converter shown in FIG. 1 in accordance with various embodiments of the present disclosure. The power converter 500 shown in FIG. 8 is similar to the power converter 200 shown in FIG. 2 except that the spread spectrum reference is controlled by a master clock 222 through a phase-locked loop (PLL) apparatus 220. In some applications, the switching frequency of the power converter 500 is forced to follow a known frequency for the purpose of controlling noise. The known frequency may be generated from the master clock 222. The switching frequency and/or the phase of the power converter 500 are compared with the switching frequency and/or the phase of the master clock 222. The PLL apparatus 220 controls the on/off of the switches (e.g., switches S1-S5 in FIG. 3) of the spread spectrum reference 210 to synchronize the switching frequency and/or the phase of the power converter 500 with the switching frequency and/or the phase of the master clock 222. The detailed implementation of this control scheme will be described below with respect to FIG. 9.

Figure 9:
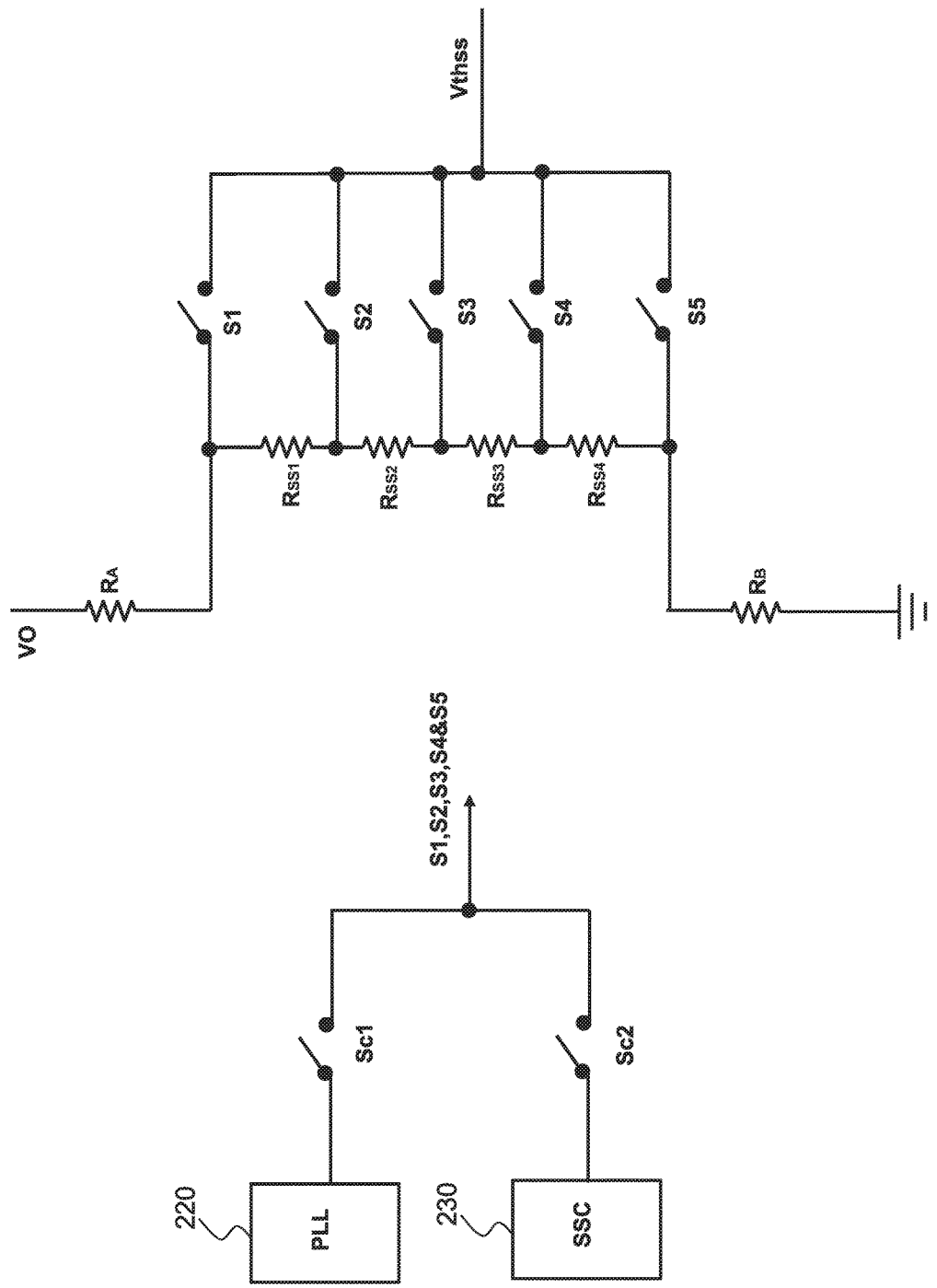
FIG. 9 illustrates a schematic diagram of the spread spectrum reference shown in FIG. 7 in accordance with various embodiments of the present disclosure.

FIG. 9 illustrates a schematic diagram of the spread spectrum reference shown in FIG. 8 in accordance with various embodiments of the present disclosure. There are two controllers 220 and 230 for controlling the on/off of switches S1-S5. The PLL apparatus 220 is employed to force the switching frequency and/or the phase of the power converter 500 to match the frequency and/or the phase of the master clock 222 (shown in FIG. 8). The controller 230 is used to achieve the spread spectrum control described above with respect to FIG. 3. The outputs of the PLL apparatus 220 and the spread spectrum controller 230 are connected together through two switches, Sc1 and Sc2.

In some embodiments, when Sc1 is turned on and Sc2 is turned off, the on/off of the switches S1-S5 are controlled by the PLL apparatus 220. The switching frequency and/or the phase of the power converter 500 are approximately equal to the frequency and/or the phase of the master clock 222 shown in FIG. 8. On the other hand, when Sc1 is turned off and Sc2 is turned on, the on/off of the switches S1-S5 are controlled the controller 230. The controller 230 is able to vary the switching frequency of the power converter 500 so that the spectral energy of the power converter 500 is spread over a wide range. Throughout the description, Sc1 and Sc2 are alternatively referred to as an operation mode selector.

Figure 10:
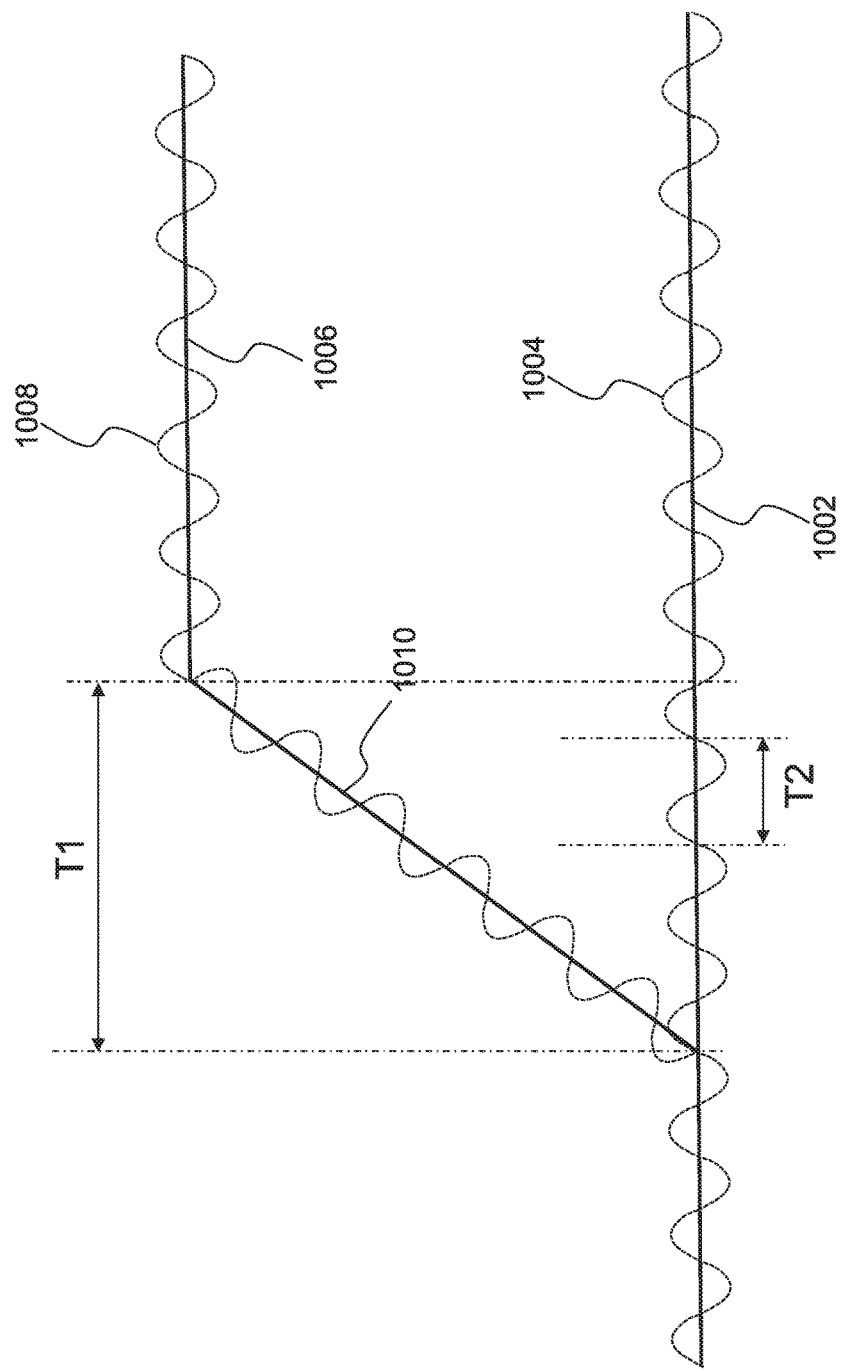
FIG. 10 illustrates a control scheme combining both the spread spectrum control and the phase-locked loop (PLL) control in accordance with various embodiments of the present disclosure.

FIG. 10 illustrates a control scheme combining both the spread spectrum control and the PLL control in accordance with various embodiments of the present disclosure. A first straight line 1002 represents a switching frequency of a power converter (e.g., power converter 500 shown in FIG. 5). In some embodiments, the switching frequency of the power converter is about 1 MHz. A first sinusoidal waveform 1004 and a second sinusoidal waveform 1008 represent a frequency perturbation generated by a spread spectrum apparatus (e.g., the controller 230 shown in FIG. 3). A slope 1010 and a second straight line 1006 represent a frequency change under the control of a master clock (e.g., the master clock 222 and the PLL apparatus 220 shown in FIG. 8). As shown in FIG. 10, the spread spectrum control and the master clock control can be combined together to further improve the performance of the power converter 500.

Under the master clock control, the frequency transition time is defined as T1. The period of the first sinusoidal waveform 1004 is defined as T2. In some embodiments, in order to have a stable frequency transition under the master clock control, T1 is greater than T2 as shown in FIG. 10.

Figure 11:
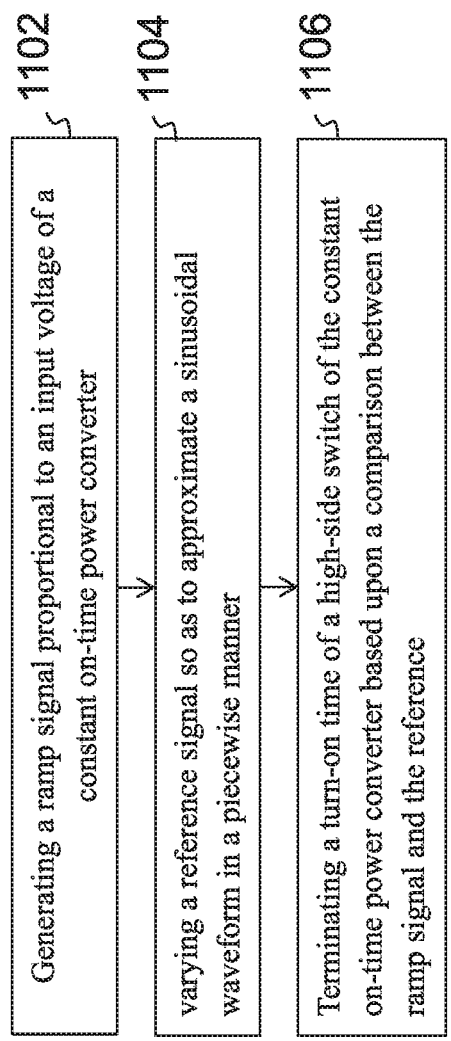
FIG. 11 illustrates a flow chart of a method for controlling the power converter shown in FIG. 3 in accordance with various embodiments of the present disclosure.

FIG. 11 illustrates a flow chart of a method for controlling the power converter shown in FIG. 3 in accordance with various embodiments of the present disclosure. This flowchart shown in FIG. 11 is merely an example, which should not unduly limit the scope of the claims. One of ordinary skill in the art would recognize many variations, alternatives, and modifications. For example, various steps illustrated in FIG. 11 may be added, removed, replaced, rearranged and repeated.

Referring back to FIG. 3, the power converter 100 comprises the first switch Q1, the second switch Q2 connected in series between an input power source VIN and ground. The inductor is connected between a common node of Q1 and Q2, and the output of the power converter 100. In operation, the leading edge of the gate drive signal applied to Q1 is determined by a comparison result between a reference and a voltage proportional to an output voltage of the power converter. A trailing edge of the gate drive signal applied to Q1 is determined by a comparison result between a voltage ramp and a variable voltage source.

At step 1102, a ramp signal is generated through charging a capacitor by a current source. The current level of the current source is proportional to an input voltage of the power converter.

At step 1104, a spread spectrum controller is used to vary a reference signal generated by the variable voltage source. The spread spectrum controller is configured such that a voltage perturbation of the reference signal approximates a sinusoidal waveform in a piecewise manner.

At step 1106, the turn-on time of the high-side switch of the power converter is terminated based upon a comparison between the ramp signal and the reference signal generated by the variable voltage source. In some embodiments, by adjusting the output of the variable voltage source, the switching frequency of the power converter may vary accordingly. As a result, the spectral energy of the power converter is spread over a wide range.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a first switch and a second switch connected in series between an input power source and ground;

an inductor connected between a common node of the first switch and the second switch, and an output capacitor; and a pulse width modulation (PWM) generator configured to control an on-time of the first switch, wherein the PWM generator has a first input configured to receive a comparison result between a first reference and a voltage ramp, and a second input configured to receive a feedback signal, and wherein:

the feedback signal is generated based on a comparison result between a voltage across the output capacitor and a second reference; and the first reference comprises a variable voltage source connected in series with a fixed voltage source, wherein the variable voltage source is configured to adjust a threshold for turning off the first switch, and wherein the first reference is generated by a plurality of series-connected resistors and a plurality of switches connected between the output capacitor and ground.

2. The apparatus of claim 1, wherein:
the PWM generator comprises a latch having a reset input configured to receive the comparison result between the first reference and the voltage ramp, and a set input configured to receive the feedback signal.

3. The apparatus of claim 1, wherein:
the fixed voltage source is proportional to the voltage across the output capacitor.

4. The apparatus of claim 1, wherein:
the plurality of series-connected resistors and the plurality of switches comprise a first resistor, a resistor-switch network and a second resistor connected in series.

5. The apparatus of claim 4, wherein the resistor-switch network comprises:
a plurality of resistor-switch network resistors connected in series between the first resistor and the second resistor; and
the plurality of switches having first terminals connected to the plurality of resistor-switch network resistors and second terminals connected together, and wherein two first terminals of two adjacent switches of the plurality of switches are connected to two terminals of a corresponding resistor of the plurality of resistor-switch network resistors.

6. The apparatus of claim 5, wherein:
a common node of the plurality of switches is an output of the first reference.

7. The apparatus of claim 1, wherein:
the voltage ramp is in synchronization with a gate drive signal of the first switch.

8. The apparatus of claim 1, further comprising:
an operation mode selector having a first input connected to a master clock through a phase-locked loop and a second input connected to a spread spectrum controller, wherein the operation mode selector is configured such that:
a switching frequency of the apparatus is equal to a frequency of the master clock when the master clock is applied to the apparatus through the operation mode selector; and
spectral energy of the apparatus is spread over a wide range when the spread spectrum controller is applied to the apparatus through the operation mode selector.

9. A method comprising:
providing a ramp signal proportional to an input voltage of a constant on-time power converter;

varying a reference signal through a variable voltage source connected in series with a fixed voltage source, so as to approximate a sinusoidal waveform in a piecewise manner, wherein the reference signal is generated by a plurality of series-connected resistors and a plurality of switches connected between an output voltage terminal of the constant on-time power converter and ground; and terminating a turn-on time of a high-side switch of the constant on-time power converter based upon a comparison between the ramp signal and the reference signal.

10. The method of claim 9, further comprising:
varying the reference signal using a spread spectrum apparatus, wherein the spread spectrum apparatus comprises the plurality of series-connected resistors and the plurality of switches, and wherein the plurality of series-connected resistors and the plurality of switches comprise a first resistor, a resistor-switch network and a second resistor connected in series between an output of the constant on-time power converter and ground.

11. The method of claim 10, wherein the resistor-switch network comprises:
a plurality of resistor-switch network resistors connected in series between the first resistor and the second resistor; and
the plurality of switches having first terminals connected to the plurality of resistor-switch network resistors and second terminals connected together, and wherein two first terminals of two adjacent switches of the plurality of switches are connected to two terminals of a corresponding resistor of the plurality of resistor-switch network resistors.

12. The method of claim 9, wherein the constant on-time power converter comprises:
the high-side switch and a low-side switch connected in series between an input power source and ground; and
an inductor connected between a common node of the high-side switch and the low-side switch, and an output of the constant on-time power converter.

13. The method of claim 9, further comprising:
adjusting a switching frequency of the constant on-time power converter through a master clock and a phase-locked loop.

14. The method of claim 9, further comprising:
varying the reference signal so that a voltage perturbation of the reference signal follows the sinusoidal waveform.

15. A power converter comprising:
a first switch and a second switch connected in series between an input power source and ground;
an inductor connected between a common node of the first switch and the second switch, and an output capacitor; and
a pulse width modulation (PWM) generator configured to generate a gate drive signal for the first switch, wherein:
a leading edge of the gate drive signal is determined by a comparison result between a reference and a voltage proportional to an output voltage of the power converter; and
a trailing edge of the gate drive signal is determined by a comparison result between a voltage ramp and a reference voltage source including a fixed voltage source connected in series with a variable voltage source, wherein the reference voltage source is generated by a plurality of series-connected resistors and a plurality of switches connected between an output voltage terminal of the power converter and ground.

16. The power converter of claim 15, wherein:
the variable voltage source is controlled by a tap-selecting logic circuit based upon a wave whose waveform resembles a sinusoidal curve.

17. The power converter of claim 16, wherein the tap-selecting logic circuit comprises:
the plurality of series-connected resistors and the plurality of switches, and wherein the plurality of series-connected resistors and the plurality of switches comprise a first resistor, a resistor-switch network and a second resistor connected in series, and wherein the resistor-switch network comprises:
a plurality of resistor-switch network resistors connected in series between the first resistor and the second resistor; and
the plurality of switches having first terminals connected to the plurality of resistor-switch network resistors and second terminals connected together, and wherein two first terminals of two adjacent switches of the plurality of switches are connected to two terminals of a corresponding resistor of the plurality of resistor-switch network resistors.

18. The power converter of claim 16, wherein:
the tap-selecting logic circuit is configured such that a voltage perturbation of the variable voltage source follows a sixteen-step sinusoidal waveform.

19. The power converter of claim 15, further comprising:
a master clock and a phase-locked loop, wherein the master clock and the phase-locked loop are configured such that a switching frequency of the power converter is equal to a frequency of the master clock.

* * * * *